United States Patent [19]

Osler et al.

[11] Patent Number: 5,099,415
[45] Date of Patent: Mar. 24, 1992

[54] GUESS MECHANISM FOR VIRTUAL ADDRESS TRANSLATION

[75] Inventors: Peter J. Osler, Jericho, Vt.; Fred T. Tong, Hopewell Junction, N.Y.

[73] Assignee: International Business Machines, Armonk, N.Y.

[21] Appl. No.: 311,666

[22] Filed: Feb. 15, 1989

[51] Int. Cl.[5] .......................................... G06F 12/10
[52] U.S. Cl. ................... 395/400; 364/256.3; 364/256.4; 364/955.5; 364/DIG. 1; 364/DIG. 2
[58] Field of Search ... 364/200 MS File, 900 MS File

[56] References Cited

U.S. PATENT DOCUMENTS

| | | | |
|---|---|---|---|
| 4,050,094 | 9/1977 | Bourke | 364/200 |
| 4,128,875 | 12/1978 | Thurber et al. | 364/200 |
| 4,170,039 | 10/1979 | Beacom et al. | 364/200 |
| 4,218,743 | 8/1980 | Hoffman et al. | 364/200 |
| 4,241,401 | 12/1980 | DeWard et al. | 364/200 |
| 4,376,297 | 3/1983 | Anderson et al. | 364/200 |
| 4,410,941 | 10/1983 | Barrow et al. | 364/200 |
| 4,481,573 | 11/1984 | Fukunaga et al. | 364/200 |
| 4,583,162 | 4/1986 | Prill | 364/200 |
| 4,691,277 | 9/1987 | Kronstadt et al. | 364/200 |

OTHER PUBLICATIONS

Voss, "Virtual Address Translation Speedup Circuitry", IBM Tech. Disc. Bulletin, vol. 24, No. 1B, Jun. 81.
Ngai et al., "Two-Level DLAT Hierarchy", IBM Tech. Disc. Bulletin, vol. 24, No. 9, Feb. 82, pp. 4774–4775.
Lee et al., "A Solution to Synonym Problem", IBM Tech. Disc. Bulletin, vol. 22, No. 8A, Jan 80, pp. 3331–3333.
Drimak et al., "Directory Look-Aside Table Controls", IBM Tech. Disc. Bulletin, vol. 24, No. 2, Jul. 81, pp. 1266–1267.
Schuenemann, "Fast Address Translation . . . and a Cache Memory", IBM Tech. Disc. Bulletin, vol. 21, No. 2, Jul. 78, pp. 663–664.
Gannon et al., "DLAT Common Segment Multiple Compare Circuits", IBM Tech. DIsc. Bulletin, vol. 20, No. 5, Oct. 77, pp. 1857–1858.
Wetzel, "Offset Register", IBM Tech. Disc. Bulletin, vol. 14, No. 7, Dec. 71, pp. 2067–2068.

*Primary Examiner*—Joseph A. Popek
*Assistant Examiner*—Michael A. Whitfield
*Attorney, Agent, or Firm*—Thomas P. Dowd

[57] ABSTRACT

A system providing a guess mechanism for improving the speed of translating effective addresses produced by a processor to real addresses in memory is disclosed wherein a set of Lookaside Tables and logic elements are used along with a set of validity registers and an MRU register to guess at the appropriate real frame index from one of the Tables to be output in the real address in the first cycle of a two cycle operation. The low order bits of the effective address are sent to index the Tables during the first cycle and the high order bits are used during the second cycle for comparison with the set of Table entries selected in the first cycle as containing the real frame index that is output. The selection of the actual real frame index that is output involves a guess using the validity and MRU registers along with indexing of the Tables by a portion of the low order bits. If the logic indicates, upon comparison of 1) the Table entry containing the real frame index that is output during the first cycle with 2) the high order bit comparison of the second cycle, that the selected real frame index was inappropriate, a signal is sent after the second cycle to invalidate the output of the real address incorporating that real frame index.

19 Claims, 3 Drawing Sheets

Timing Diagram

TIDS ⟹ TRANSLATION IDLE STATE

TGUS ⟹ TRANSLATION GUESS STATE

TGCS ⟹ TRANSLATION GUESS CORRECTION STATE

GUESS MECHANISM FOR VIRTUAL ADDRESS TRANSLATION

BACKGROUND OF THE INVENTION

1. Field of the Invention

The present invention relates to a system and method for translating virtual addresses, that result from effective addresses output by a digital processor, to real addresses in computer memory and, more particularly, to a guess mechanism that speeds up the translation process.

2. Prior Art

The use of Lookaside Tables for converting and translating virtual addresses to real addresses during data processing is well known wherein table entries store previously translated addresses so that they are readily obtainable when the same virtual address is again requested. This technique, which takes advantage of the probability that an address request once processed will be repeated, shortens the time needed for address processing by obviating the need to go to main memory each time the request occurs.

One example of a prior art system using a partitioned Translation Lookaside Buffer (TLB) is found in U.S. Pat. No. 4,367,297 to J. A. Anderson et al, wherein, upon a suitable match with an incoming address, an address stored in the TBL is used for translation, aborting the more time-consuming, conventional multiple-fetch address translation process. Another example of a prior system, this one featuring the use of a pre-translate Table in lieu of a partitioned TBL to speed the translation process, is disclosed in U.S. Pat. No. 4,170,039 to T. J. Beacom et al. It will be seen from these examples and a study of the related art that speedup of the translation process is an inherent problem in the art which has been dealt with in many different ways.

It is an object of the present invention to offer a solution to that problem in a simple, efficient, and improved manner by using a guess mechanism involving an algorithm providing a most-recently-used indication that achieves a high probability of correct guesses.

SUMMARY OF THE INVENTION

The present invention is embodied in a system and method that provides a guess mechanism for improving the speed of translating effective addresses produced by a processor to real addresses in memory, wherein a set of Lookaside Tables and logic elements are used, along with a set of validity registers and an MRU register, to select an appropriate real frame index from one of the Tables for output in the real address during the first cycle of a two cycle operation. More particularly, each Table in the set has a list of address entries therein with the address entries arranged in sets across the Tables and each entry comprising a virtual page index (VPI), a Segment ID (SID), and a real frame index (RFI). Each of the validity registers contains bits having values respectively indicative of the validity of each entry in a respective Table of the set, and the MRU register contains bits corresponding to each set of address entries, these bits having values respectively indicative of the Table in each set containing the most-recently-used (MRU) entry of the set. The bits in the validity and MRU registers provide an input to the guess mechanism that greatly increases the chances of a correct guess in outputting an RFI to the real address during the first cycle.

In operation, a portion of the effective address (EA) bits, the low-order bits, are indexed into the Tables during the first cycle to read out, in response to a match for a set of address entries, the real frame index from each entry in the matched set. Using the same low order effective address bits, the validity registers and the MRU register are checked to determine the values of the bits therein corresponding to the matched set of address entries. A "guess" real frame index is then selected, from among the RFIs in the matched set of address entries, to be output for incorporation in a real address in response to 1) the determination of a valid bit in the respective validity register for the selected address entry containing the "guess" RFI, and 2) an MRU-indicative bit value in the MRU register indicative of the Table in the matched set in which the "guess" RFI is contained. The high order bits of the effective address are then used during the second cycle to check the first cycle guess by indexing them to SID registers and comparing them with the set of Table entries selected in the first cycle as containing the appropriate real frame index ("guess" RFI). If the logic indicates, upon comparison of 1) the Table entry containing the "guess" RFI that is output during the first cycle with 2) the high order bit comparison of the second cycle, that the selected real frame index was inappropriate, a signal is sent after the second cycle to invalidate the output of the real address incorporating that "guess" RFI. In view of the fact that the large majority of guesses will be correct due to the validity and MRU register checks, significant performance improvement in virtual address translation is achieved.

DETAILED DESCRIPTION OF THE PREFERRED EMBODIMENT(S)

Figure 1:
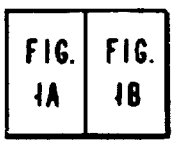
FIG. 1, including
Figure 1B:
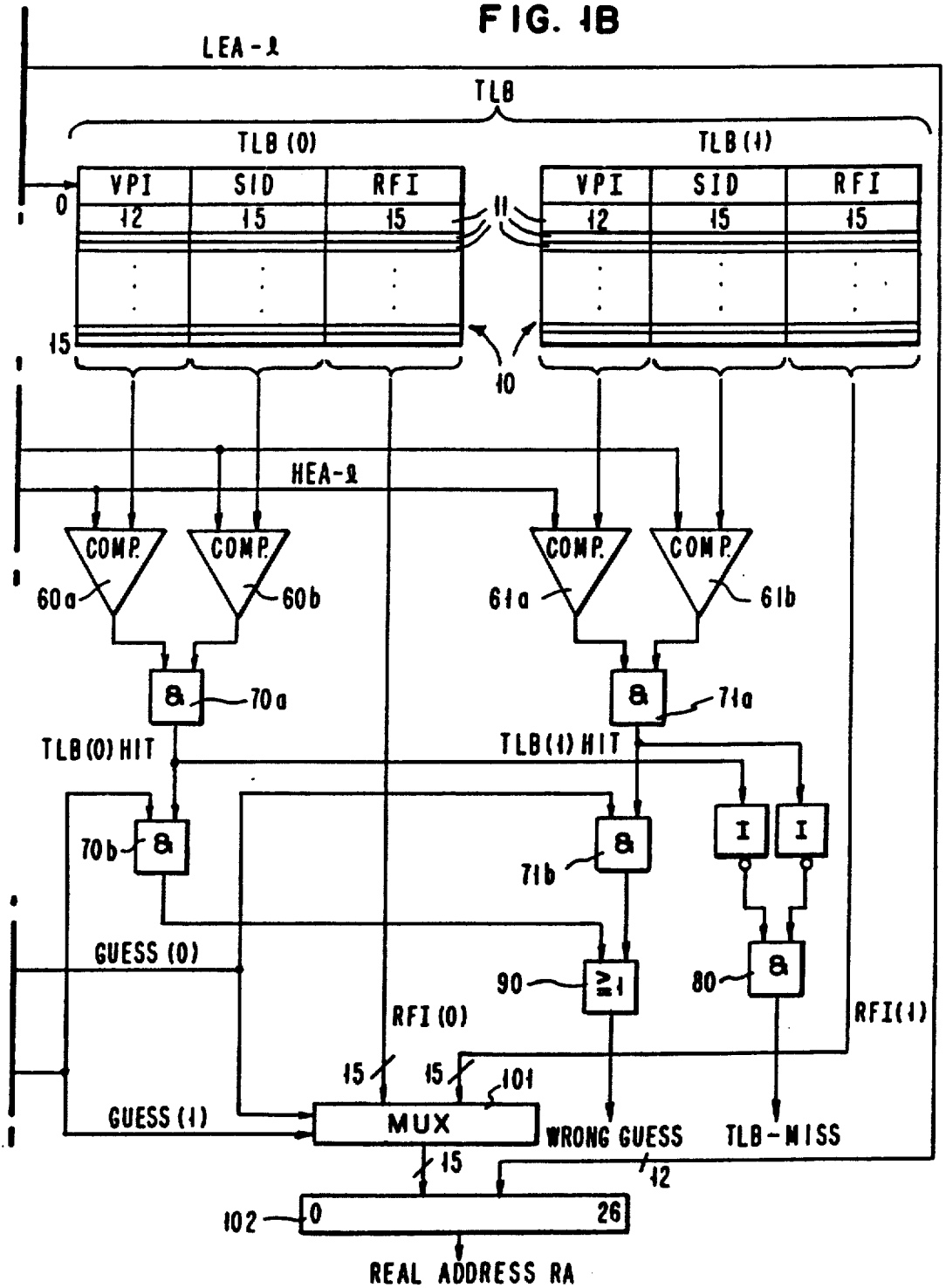
FIGS. 1A and FIG. 1B, is a schematic diagram illustrating the data flow among a preferred configuration of functional elements for carrying out the present invention.
Figure 1A:
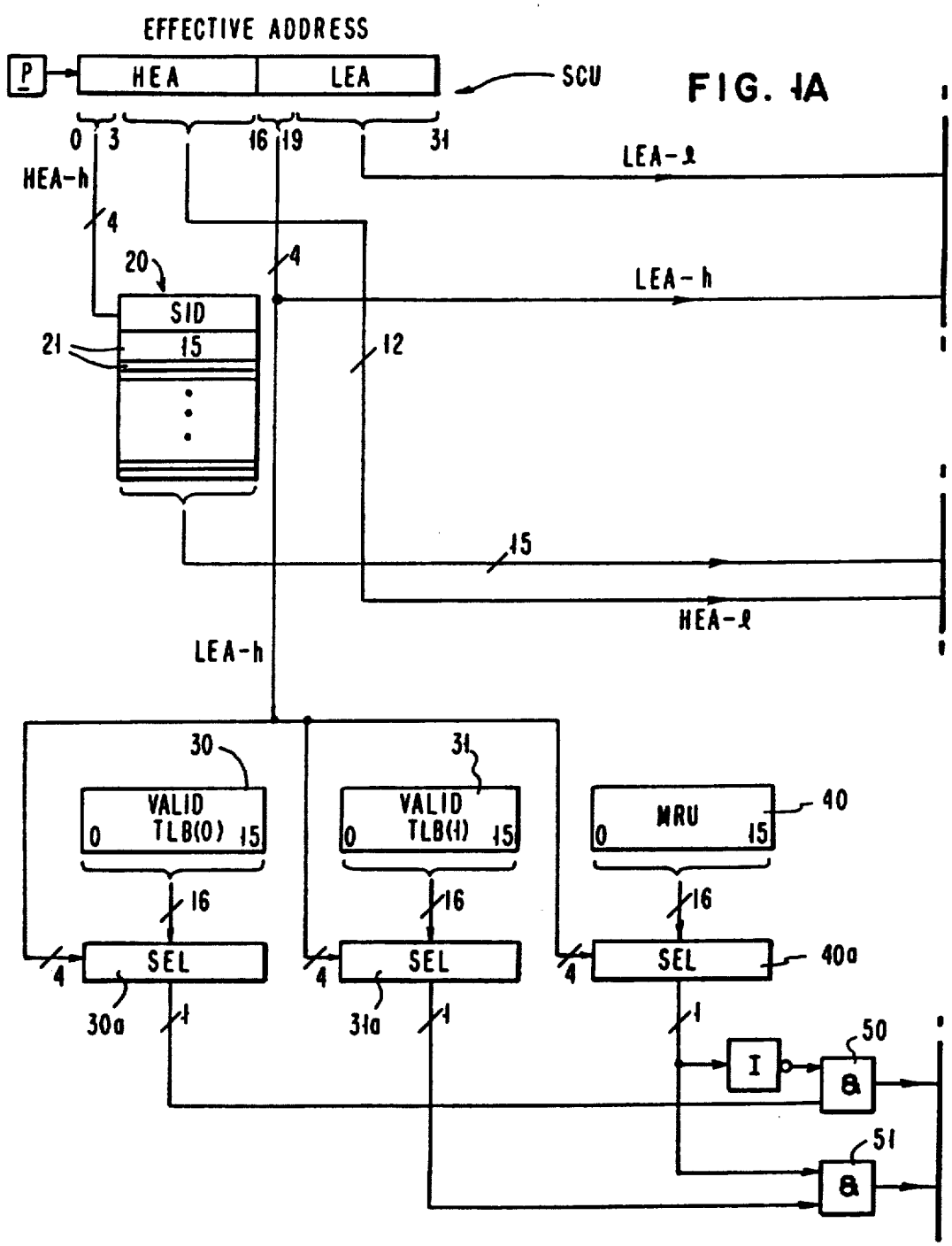

A diagram illustrating the data flow among the functional elements while carrying out the present invention is shown in FIG. 1. A preferred configuration and the related functions of the virtual translation that are relevant to achieving the invention will be described in detail herein; however, it will be seen that the invention can be applied to other generic translation schemes with different configurations.

Briefly, among the elements generally making up the system are the following:

A Translation Lookaside Buffer (TLB), 2 way associative, 16 congruence classes, containing a set of Tables (10), e.g., TLB(0), TBL(1), each with a set of address entries:

Virtual Page Index (VPI): 12 bits;
Segment ID (SID): 15 bits;
Real Frame Index (RFI): 15 bits;

16 Segment Registers (20) with SID entries, each containing 15 bits;

A Validity Register (30, 31) for each Table TLB(0), TLB(1), each containing 16 bits.

A Most-Recently-Used (MRU) Register (40) containing 16 bits;

Control Logic (50, 51) for selecting a "guess" RFI;

Control Logic (60a, 60b, 61a, 61b, 70a, 70b, 71a, 71b, 80, 90) for checking the selected "guess" RFI.

Essectial signals involved in the data flow are:

EA (Effective Address): comprises 16 high-order bits (HEA) and 16 low-order bits (LEA), the first four of each (HEA-h, LEA-h) being used for indexing, while the last twelve of the HEA bits (HEA-l) are used for guess checking and the last twelve of the LEA bits (LEA-l) are added as the low-order bits of the real address (RA) output.

VA (Virtual Address): comprises 15 SID bits of a Segment Register, the 12 bits of HEA-l, the 4 bits of LEA-h, and the 12 bits of LEA-l.

RA (Real Address): comprises 15 high-order bits, indicative of an RFI selected from one of the Tables, and 12 low-order bits.

GUESS(0): used to control the multiplexing for sending out RFI(0).

GUESS(1): used to control the multiplexing for sending out RFI(1).

TLB(0)HIT: a compare indication derived from TLB(0).

TLB(1)HIT: a compare indication derived from TLB(1).

TLB-MISS: indicates that no match was found in the TLB entries.

WRONG GUESS: indicates that the guess address in not the same as the compared address.

More particularly, a preferred system for carrying out the translating and guessing operation of the present invention is shown in detail in, and will be described with reference to, FIG. 1. The system firstly comprises a Translation Lookaside Buffer, TLB, containing a set of Lookaside Tables 10. For convenience of description, two such Tables, TLB(0) and TLB(1), are shown in the figure, each being 2-way associative with 16 congruence classes, but it will be appreciated from the following description that more Tables may be readily added to the set with appropriate modifications to the associated components. Each Table, TLB(0) and TLB(1), contains a list of address entries (conveniently 16), with adjacent entries 11 operating in parallel to form sets across the Tables. Each address entry 11 consists of a Virtual Page Index (VPI) of 12 bits. a Segment ID (SID) of 15 bits, and a Real Frame Index (RFI) of 15 bits. It will be seen by those of skill in the art that this configuration is selected to conveniently conform to such computer architectures as the IBM 370 and the like, and those skilled in the art will be familiar with the process for providing appropriate Table entries so that no explanation in this regard will be given here.

In addition to the Translation Lookaside Buffer, TLB, the system includes a group of Segment Registers 20 (conveniently 16 to conform to the number of address entries in the TLB Table lists) of 15 bits each, two Validity Registers 30 and 31, of 16 bits each, and a Most-recently-used (MRU) Register 40 of 16 bits. The Segment Registers 20 contain SID entries 21 for comparison with the SIDs in the entries 11 in the Lookaside Tables, TLB(0) and TLB(1), as will be more fully explained below. The Validity Registers 30 and 31 contain bits respectively indicative of the validity of the address entries 11 in TLB(0) and TLB(1), and MRU Register 40 contains bits, for each set of parallel address entries in the Tables, having values which indicate the particular Table 10 in the set containing the most-recently-used entry of the set. Registers 30, 31, and 40 have respectively associated Select Macros 30a, 31a, and 40a containing entries related to those in the Tables 10.

Further, a combination of logic elements is provided, including: comparators 60a, 60b, 61a, AND gates, 70a and 70b, 71a and 71b, 50 and 51, and 80; and OR gate 90, along with a multiplexing output unit 101, for use in producing the guess mechanism and the RFI to be incorporated in the real address ultimately output by unit 102 to the system as will now be explained.

The guess mechanism is operated and the real address (RA) is ultimately output by the system in the manner as follows. To begin with, the 32 bits of an effective address (EA) to be translated are sent from a digital processor P to a system control unit SCU in two consecutive cycles, that is, half the bits or 16 bits are sent in each cycle. In accordance with the invention, the low half of the effective address LEA (bits 16:31) is sent first, and the high half HEA (bits 0:15) is sent in the next cycle. The first four bits LEA-h of the low half of the EA (16:19) are used to index into the TLB. If a match is encountered with a set of address entries 11 listed in the Tables, then the real frame indexes (RFIs) from the appropriate parallel entries, two in the example case, are read from TLB(0) and TLB(1) and sent directly to the multiplexing output unit 101. The RFI output by unit 101 will be incorporated, along with the remainder of the low order bits LEA-l (20:31), into the real address RA sent out by unit 102 following the first cycle. However, since only one RFI is correct and comparisons are needed between the high-order bits (HEA) and the TLB entries to determine which is the proper RFI to use, and that information is not available until the next cycle, it would seem to be necessary to wait until the completion of the second cycle to output the correct address. In accordance with the invention, to speed the process, an immediate decision or guess may be made to select one RFI to be output in the real address RA after the first cycle, which selection may be checked after the second cycle and, if the selection is incorrect, the real address may be invalidated. To achieve a worthwhile speed-up, the guess is made, using the system of FIG. 1, based on the following algorithm:

If the MRU bit=0 AND the valid bit for TLB(0)=1, use RFI(0);

If the MRU bit=1 AND the valid bit for TLB(1)=1, use RFI(1).

This algorithm has been found to have a fairly high correct guess ratio, better than 95%, so that its use saves a cycle in nearly all (real) access to memory. Thus, this algorithm or guess mechanism contributes significantly to the speed and efficiency of system performance.

The guess mechanism of the invention is implemented in the system in the following manner. As seen in FIG. 1, in addition to indexing into the TLB, the first four bits of the low half of the EA (16:19) are also used as respective inputs to Select Macros 30a, 31a, and 40a, that are in turn operatively connected to Validity Registers 30 and 31 and MRU Register 40. The Macros contain entries related to those of the Tables 10 and provide appropriate outputs in response to comparisons of the EA bits (LEA-h) with the Validity Register bits and MRU Register bits. The single bit outputs of the Macros, in accordance with the algorithm, are sent to the AND gates 50 and 51. Macros 30a and 31a provide respective inputs to gates 50 and 51, while Macro 40a provides its output to each gate, the input to gate 50 being inverted. AND gates 50 and 51 produce respective guess output signals GUESS(0) and GUESS(1) for input to multiplexing output unit 101, and respectively to AND gates 71b and 70b.

It will be seen that one or the other of the AND gates 50 and 51 will produce an output GUESS signal for input to the multiplexing output unit 101. In keeping with the algorithm set forth above, if the MRU output is 1 and the Validity Register 31 and Macro 31a for TLB(1) has an output of 1, then gate 51 will provide an output to multiplexing unit 101 that will cause the RFI(1) signal to be output for incorporation into the real address output RA along with the LEA-l bits in a suitable output unit 102. Conversely, if the MRU output is 0 and the Validity Register 30 and Macro 30a for TLB(0) has an output of 1, then gate 50 will provide an output to multiplexing unit 101 that will cause the RFI(0) signal to be output for incorporation into the real address output RA along with the LEA-l bits in unit 102. Thus, following the first input cycle from the processor P, a real address (RA) will be output containing an RFI portion that constitutes a best guess as between or among the various RFIs from the set of entries from the TLB Tables for which a match was found. Whether this guess is correct or not is checked in response to the information received during the second cycle.

In the second cycle, the first 4 bits (HEA-h) of the high-order bits of the EA are used to index into Segment Register 20 whereupon a match will produce an appropriate 15 bit output to SID comparators 60b and 61b for comparison with the SID outputs from Tables TLB(0) and TLb(1), which outputs resulted from the match between the LEA-h bits and an entry therein during the first cycle. The remaining 12 high-order bits (HEA-l) are input directly to VPI comparators 60a and 61a for comparison with the VPI outputs from the Tables in the same entry sets as the matched SID outputs. Comparators 60a and 60b provide inputs to AND gate 70a, and comparators 61a and 61b provide inputs to AND gate 71a. If the outputs from comparators 60a and 60b are both positive, AND gate 70a will output a TBL(0)HIT signal to AND gate 70b, and if the outputs from comparators 61a and 61b are both positive, AND gate 71a will output a TLB(1)HIT signal to AND gate 71b. In the event that no positive signal appears at the output of either AND gate 70a or 71a, AND gate 80 will output a signal (TLB-MISS) indicating that the indexing bits LEA-h found no match in the Table entries during the first cycle. The address request must therefore be sent to main memory for translation.

The outputs of ANd gates 70a and 71a are input to AND gates 70b and 71b along with the GUESS signals from AND gates 51 and 50, respectively. If a positive signal from gate 70a, indicating a TLB(0)HIT, is input to gate 70b at the same time a positive signal GUESS(1) is input, gate 70b will produce an output to OR gate 90 which then provides an indication of a wrong guess during the first cycle. The resulting WRONG GUESS signal, indicating that the earlier guess address is not the same as the compared address, is then used to invalidate the RA output from unit 102 containing the incorrect RFI. Similarly, if a positive signal from gate 71a, indicating a TLB(1)HIT, is input to gate 71b at the same time a positive signal GUESS(0) is input, gate 71b will produce an output to OR gate 90 which also provides an indication of a wrong guess during the first cycle. The resulting WRONG GUESS signal, indicating that the earlier guess address is not the same as the compared address, is then used to invalidate the RA output from unit 102 containing the incorrect RFI. Invalidation may involve sending a 'trash' signal to cancel the previous request and sending the correct one again, or invalidating the data from the wrong address upon request.

To ensure that the scheme will work in all cases, it is preferred that the following rules be observed.

The algorithm is only applied to I-fetch, branch, load and I/O read, but not to a store operation.

In the case of a wrong guess, a 'trash' signal is sent out to cancel the previous request and the correct one is sent out again.

No guess is made if an exception check such as a memory protection check is detected.

Figure 2:
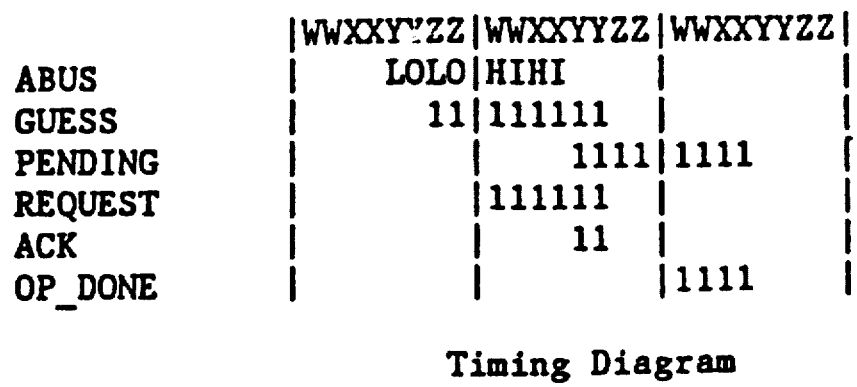
FIG. 2 is a protocol timing diagram for the data flow of FIG. 1.

A protocol timing diagram for a "guess" event is shown in FIG. 2, where

ABUS: Address bus, sends the low-order effective address bits over first, and the high-order effective address bits in the next cycle;

GUESS: a signal to initiate the guess finite state machine;

PENDING: a signal to confirm that the processor will not cancel or change the effective address;

REQUEST: sends a request to memory for data;

ACK: acknowledgement from the memory controller that the request has been received;

OP-DONE: acknowledgement that the request has been processed.

Figure 3:
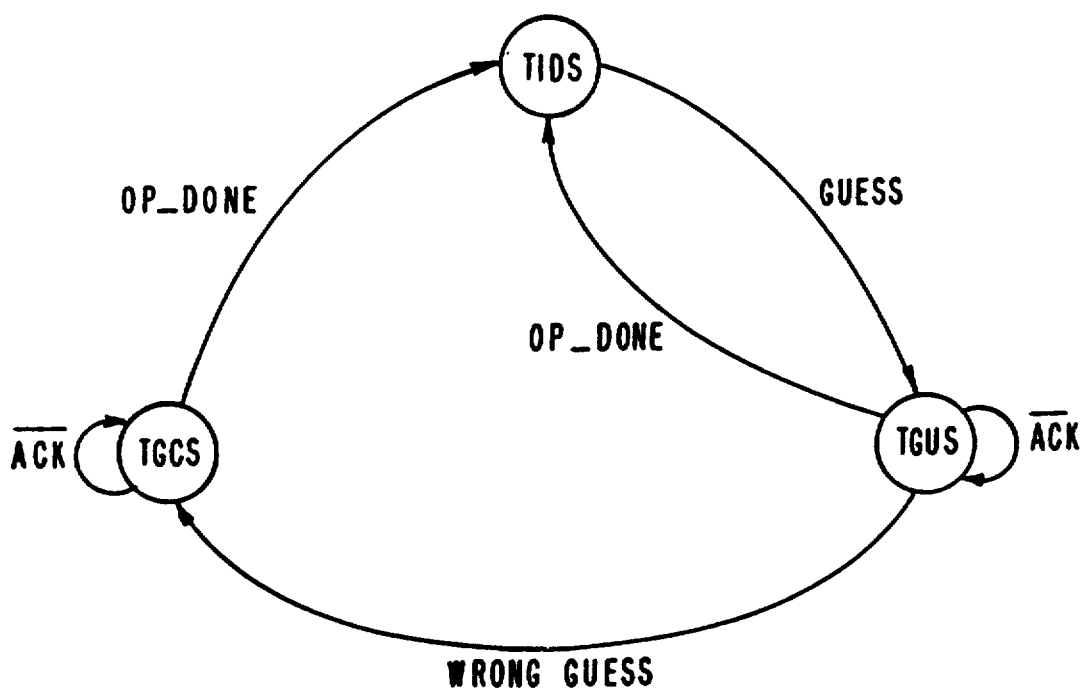
FIG. 3 shows a finite state machine illustrating the operation of the present invention.

A guess finite state machine (FSM) is implemented to handle the protocol. This FSM is integrated into the virtual contorller. For reasons of simplicity, the machine is represented in 3 states only as shown in FIG. 3, i.e., TIDS: Translation Idle State;

TGUS: Translation Guess State, initiated by a Guess signal, remains while either waiting for an acknowledgement from the memory controller or during multiple guesses;

TGCS: Translation Guess Correction State, remains until correction of the last wrong guess.

In addition, for performance reasons, a processor will usually send the address to be translated in a first cycle and then confirm the request a cycle later. This is primarily due to the internal pipe-line, look-ahead structure of the processor. It reserves the right to change the address before confirming it if it encounters pipe line disturbance such as branches. Therefore, logic is built into the finite state machine (FSM) shown in FIG. 3, to handle multiple consecutive guesses.

The invention has been described for application is a system in which the effective address is time-multiplexed. However, the same scheme can apply to all virtual systems with segment registers, since it allows the start of a request to the memory controller while the segment register is read and then compared. Having a time-multiplexed bus further enhances usefulness.

Consequently, it will be appreciated that the invention provides a system including a guess mechanism for improving the speed of translating effective addresses produced by a processor to real addresses in memory, wherein a set of validity registers and an MRU register are used to guess at the selection of an appropriate real frame index (RFI) from one of a set of Lookaside Tables, which RFI is output in the translated real address in the first cycle of a two cycle operation. A portion of the low order bits of the effective address are sent to index the Tables during the first cycle and the high order bits are used during the second cycle for comparison with the set of Table entries selected as containing the appropriate RFI in the first cycle. If the logic indicates, upon comparison of 1) the Table entry containing the real frame index (RFI) output during the first cycle with 2) the high-order bit comparison of the second cycle, that the selected RFI was inappropriate, a signal is sent after the second cycle to invalidate the the real address output incorporating the RFI.

We claim:

1. An apparatus for translating virtual addresses to real addresses in response to a multi-bit signal output by a processor and indicative of an effective address, comprising:

a set of Lookaside Tables, each Lookaside Table in said set having a list of address entries therein with the address entries arranged in sets across said set of Lookaside Tables and each address entry comprising a virtual page index and a real frame index;

a set of validity registers, each validity register containing bits having values respectively indicative of the validity of each address entry in a respective Lookaside Table of said set of Lookaside Tables;

indexing means for receiving multi-bit signals output by a processor including effective address bits and indexing a portion of said effective address bits into said Lookaside Tables to compare said portion of said effective address bits for a match with each set of address entries in said Lookaside Tables means for reading out, in response to a match between said portion of said effective address bits and a set of address entries, the real frame index from each address entry in the matched set of address entries, one of which real frame indexes is used for incorporation in a real address indicative signal register means for containing bits corresponding to each set of address entries, said bits having values respectively indicative of the Lookaside Table in each set of address entries containing the real frame index most recently-used for incorporation in a real address indicative signal;

means, using said portion of said effective address bits, for checking said validity registers and said register means to determine the values of the bits therein corresponding to the matched set of address entries; and guess means for producing a signal to select the real frame index, from those real frame indexes read out from the matched set of address entries, to be output for incorporation in a real address indicative signal, said selection signal being in response to 1) the determination of a valid bit in the respective validity register for the address entry containing said selected real frame index and 2) a bit value in said register means indicative of the Lookaside Table in said matched set in which said real frame index is contained.

2. An apparatus as in claim 1, further comprising multiplexing means, responsive to said real-frame-index- selection signals from said guess means, for outputting one of said real frame indexes from said matched set of address entries as part of a real address indicative signal output.

3. An apparatus as in claim 1, wherein said processor means provides the bits of said effective address in two consecutive cycles, said bits being ordered from higher order bits to lower order bits, with half being higher order bits and half being lower order bits, and the lower order bits being provided during the first cycle and the higher order bits being provided during the second cycle, and said indexing means provides a portion of said lower order bits to index said Lookaside Tables.

4. An apparatus as in claim 3, further comprising:

means for comparing a portion of the higher order bits provided by said processor means during the second cycle, with each of the Lookaside Table address entries in the set of address entries that is matched with said portion of said effective address bits means for producing a hit signal when said higher order bits compare in a match with one of said Lookaside Table address entries; and means for producing a miss signal when said higher order bits compare in a match with none of said Lookaside Table address entries.

5. An apparatus as in claim 4, further comprising:

output means for producing a real address indicative signal output after said first cycle means, responsive to said real-frame-index- selection signals from said guess means, for outputting one of said real frame indexes from among said matched set of address entries for incorporation as part of a real address indicative signal output produced by said output means after said first cycle; and means, responsive to the output of said one of said real frame indexes selected from among said matched set of address entries and to the production of a hit signal, and to the failure of coincidence between the output of said one selected real frame index and the production of a hit signal for said address entry in which said one selected real frame index is contained, for producing a signal after said second cycle to invalidate the output of the real address indicative signal, produced by said output means after said first cycle, incorporating said one selected real frame index.

6. An apparatus as in claim 5, wherein said means responsive to the failure of coincidence between the output of said one selected real frame index and the production of a hit signal for said address entry in which said one selected real frame index is contained, comprises means, responsive to a signal from said guess means, for producing a signal after said second cycle to invalidate the output of the real address indicative signal, incorporating said one selected real frame index, produced by said output means after said first cycle.

7. An apparatus as in claim 3, further comprising means for providing the remaining portion of said lower order bits not provided by said indexing means to index said Lookaside Tables for incorporation as part of a real address indicative signal.

8. An apparatus as in claim 4, wherein each of said Lookaside Table address entries comprise said virtural page index (VPI), said real frame index (RFI), and a segment ID (SID) entry, and said means for comparing provides a portion of the higher order bits for comparison with said SID entries, and the remaining portion of said higher order bits for comparison with said VPI entries, in the set of Lookaside Table address entries that is matched with said portion of said effective address bits.

9. An apparatus as in claim 4, further comprising:

output means for producing a real address indicative signal output after said first cycle means, responsive to said real-frame-index- selection signals from said guess means, for outputting one of said real frame indexes from among said matched set of address entries for incorporation as part of a real address indicative signal output produced by said output means after said first cycle; and means, responsive to a miss signal, for producing a signal after said second cycle to invalidate the output of the real address indicative signal, incorporating said one selected real frame index, produced by said output means after said first cycle.

10. A method for translating virtual addresses in a computer having a set of Lookaside Tables in a buffer with address entries therein arranged in sets across said set of Lookaside Tables and each address entry comprising a virtual page index and a real frame index, comprising the steps of:

providing a set of validity registers, each containing bits having values respectively indicative of the validity of each address entry in a respective Lookaside Table of said set of Lookaside Tables in said buffer;

providing a multi-bit signal indicative of an effective address;

indexing a portion of said effective address bits into said Lookaside Tables to compare said portion of said effective address bits for a match with each set of address entries in said Lookaside Tables, and reading out, in response to a match between said portion of said effective address bits and a set of address entries, a real frame index for each address entry in the matched set of address entries, one of which real frame indexes is used for inclusion in a real address indicative signal providing a register containing bits corresponding to each set of address entries, said bits having values respectively indicative of the Lookaside Table in each set of address entries containing the real frame index most recently used for inclusion in a real address indicative signal using said portion of said effective address bits to check said validity registers and said register containing bits corresponding to each set of address entries, for determining the value of the bits therein corresponding to the matched set of address entries; and producing a guess signal to select the real frame index of the matched set to be output for inclusion in a real address indicative signal, said guess signal selection being in response to the determination of a valid bit in the respective validity register for the address entry containing the selected real frame index and a bit value in said register containing bits corresponding to each set of address entries, indicative of the Table in said matched set in which said address entry containing the selected real frame index is contained.

11. A method as in claim 10, wherein said set of Lookaside Tables comprises two Tables, TLB (0) and TLB (1), said Tables reading out respective real frame indexes RFI (0) and RFI(1), in response to a match between said portion of said effective address bits and a set of address entries therein said set of validity registers comprises two registers containing valid bits respectively indicative of the validity of each address entry in the respective Tables, TLB(0) and TLB(1)

said register containing bits corresponding to each set of address entries, contains MRU bits respectively indicative of the Table containing the real frame index most-recently-used for inclusion in a real address indicative signal and wherein the respective real frame indexes RFI(0) and RFI(1) are selected to be output based on the following relationship:

when the MRU bit=0 AND the valid bit for TLB(0)=1, use RFI(0);

when the MRU bit=1 AND the valid bit for TLB(1)=1, use RFI(1).

12. A method as in claim 10, further comprising the step of multiplexing the output of said real frame indexes, in response to said guess signals, for inclusion in a real address indicative signal.

13. A method as in claim 10, further comprising the steps of providing the bits of said multi-bit signal indicative of an effective address in two consecutive cycles, said bits being ordered from higher order bits to lower order bits, with half being higher order bits and half being lower order bits, and the lower order bits being provided during the first cycle and the higher order bits being provided during the second cycle, and providing a portion of said lower order bits to index said Lookaside Tables.

14. A method as in claim 13, further comprising the step of providing the remaining portion of said lower order bits not used to index said Lookaside Tables for output with said selected real frame index to form said real address indicative signal.

15. A method as in claim 13, wherein said Lookaside Table address entries further comprise a segment ID (SID) entry, and further comprising the step of providing a portion of the higher order bits for comparison with said SID entries and the remaining portion of said higher order bits for comparison with said virtual page index entries in the set of Lookaside Table address entries that is matched with said portion of said effective address bits.

16. A method as in claim 13, further comprising the steps of:

comparing a portion of the higher order bits provided during the second cycle, with each of the Lookaside Table address entries in the set of address entries that is matched with said portion of said effective address bits producing a hit signal when said higher order bits compare in a match with one of said Lookaside Table address entries; and producing a miss signal when none of said Lookaside Table address entries compares in a match with said higher order bits.

17. A method as in claim 16, further comprising the steps of:

producing a real address indicative signal output after said first cycle outputting, in response to a guess signal, said selected real frame index as part of a real address indicative signal produced after said first cycle; and in response to the failure of coincidence between the output of the guess signal for said selected real frame index and the production of a hit signal for the entry containing said index, producing a signal after said second cycle to invalidate the output of the real address indicative signal, including said selected real frame index, produced after said first cycle.

18. A method as in claim 17, wherein the failure of coincidence between said guess signal for said selected real frame index and a hit signal for said entry containing said index is detected by ANDing said guess signal and said hit signal.

19. A method as in claim 16, wherein said selected real frame index is output in a real address indicative signal after said first cycle, and further comprising the step of producing a signal after said second cycle, in response to a miss signal, to invalidate the output of said real address indicative signal including said selected real frame index.

* * * * *